United States Patent [19]

Schlapman et al.

[11] 4,421,177
[45] Dec. 20, 1983

[54] END DRIVE ROTARY CULTIVATOR

[75] Inventors: William J. Schlapman, Winneconne; Roger T. Gault, Wild Rose, both of Wis.

[73] Assignee: J. I. Case Company, Racine, Wis.

[21] Appl. No.: 310,080

[22] Filed: Oct. 9, 1981

[51] Int. Cl.³ .................... A01B 33/02; A01B 33/16
[52] U.S. Cl. .................................. 172/63; 172/123; 172/125
[58] Field of Search ............................ 172/118–123, 172/42, 43, 44, 548, 549, 568, 112, 125, 63; 272/69; 474/114, 115

[56] References Cited

U.S. PATENT DOCUMENTS

| | | | |
|---|---|---|---|
| 1,520,949 | 12/1924 | Hemleb | 474/114 |
| 2,480,419 | 8/1949 | Patterson | 172/549 X |
| 2,579,869 | 12/1951 | Schmitter | 474/114 |
| 2,847,924 | 8/1958 | Quick | 172/42 |
| 2,892,504 | 6/1959 | Mowbray | 172/125 X |
| 2,943,687 | 7/1960 | Merry et al. | 172/123 X |
| 3,029,879 | 4/1972 | Wells, Jr. | 172/112 X |
| 3,108,642 | 10/1963 | Hunter | 172/44 |
| 3,731,917 | 5/1973 | Townsend | 272/69 |
| 3,772,987 | 11/1973 | Difley et al. | 474/114 X |
| 4,044,841 | 8/1977 | Smith et al. | 172/119 X |
| 4,139,064 | 2/1979 | Dobberpuhl | 474/114 X |
| 4,159,745 | 7/1979 | Hood et al. | 172/44 X |

FOREIGN PATENT DOCUMENTS

| | | | |
|---|---|---|---|
| 65834 | 8/1975 | Australia | 172/112 |
| 2003632 | 8/1971 | Fed. Rep. of Germany | 172/125 |
| 1070778 | 6/1967 | United Kingdom | 172/42 |
| 2028075 | 3/1980 | United Kingdom | 172/123 |

OTHER PUBLICATIONS

Dakon Rock Windrower Advertising Circular Form No. 1075-RW5M 1-1975.

Primary Examiner—Paul E. Shapiro
Attorney, Agent, or Firm—Dressler, Goldsmith, Shore, Sutker & Milnamow, Ltd.

[57] ABSTRACT

A rotary cultivator is disclosed which is adapted to be supported upon a rear-mounted tractor hitch. The cultivator includes a tined cultivation shaft and a hydraulic motor and drive mechanism for driving one end of the shaft. The cultivator includes an arrangement for selectively varying the speed ratio of the hydraulic motor and cultivation shaft, as well as for selectively changing the length of the cultivation shaft so that the width of the path of soil cultivation may be changed as desired. A pair of spaced, negatively angled ground-engaging surfaces are provided on the cultivator housing for urging the cultivator downwardly during forward movement thus providing a more uniform depth of penetration during soil cultivation.

4 Claims, 8 Drawing Figures

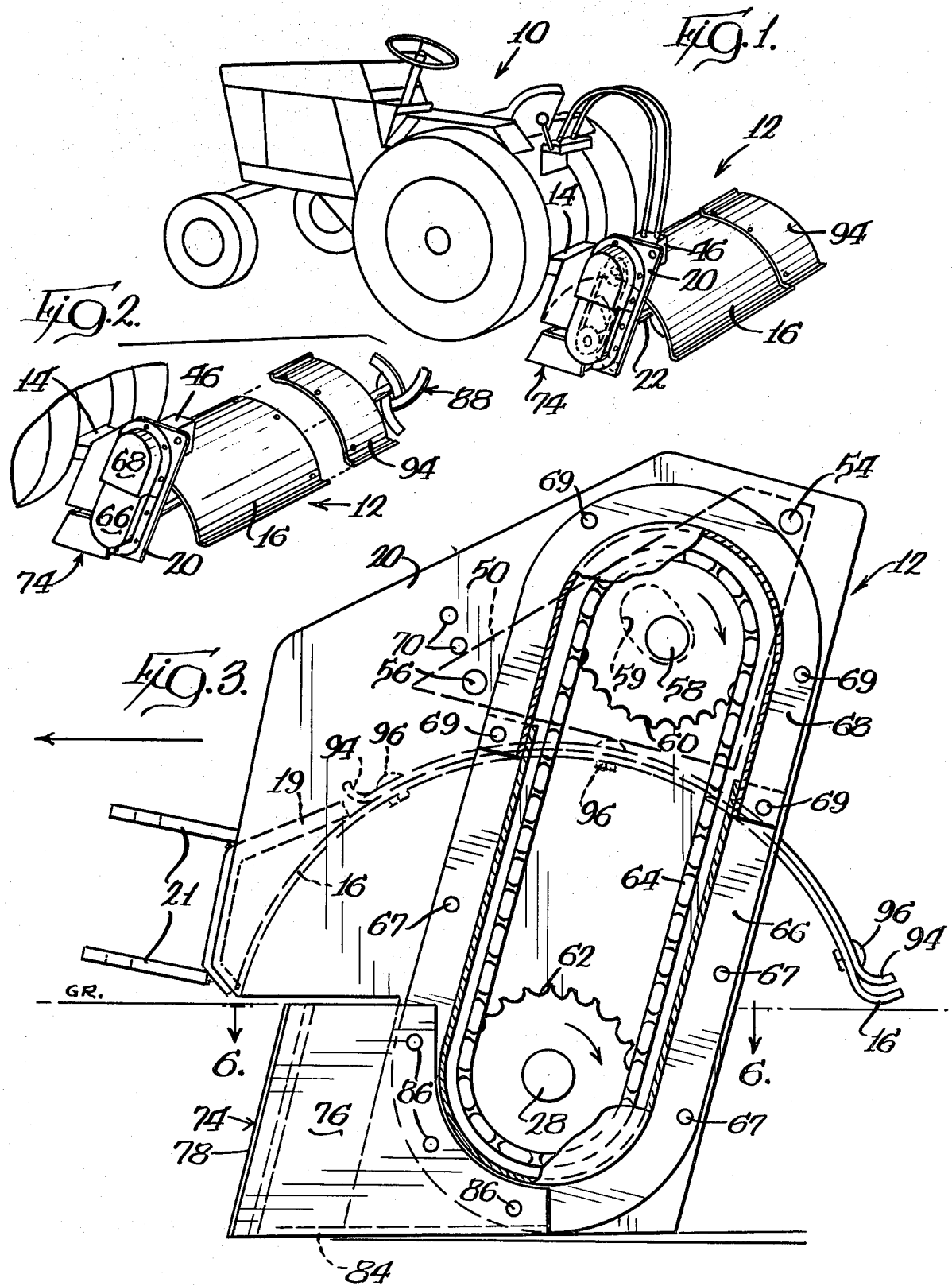

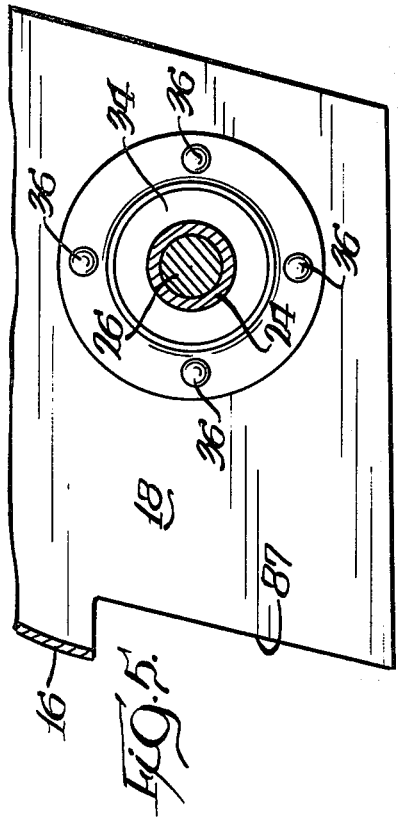
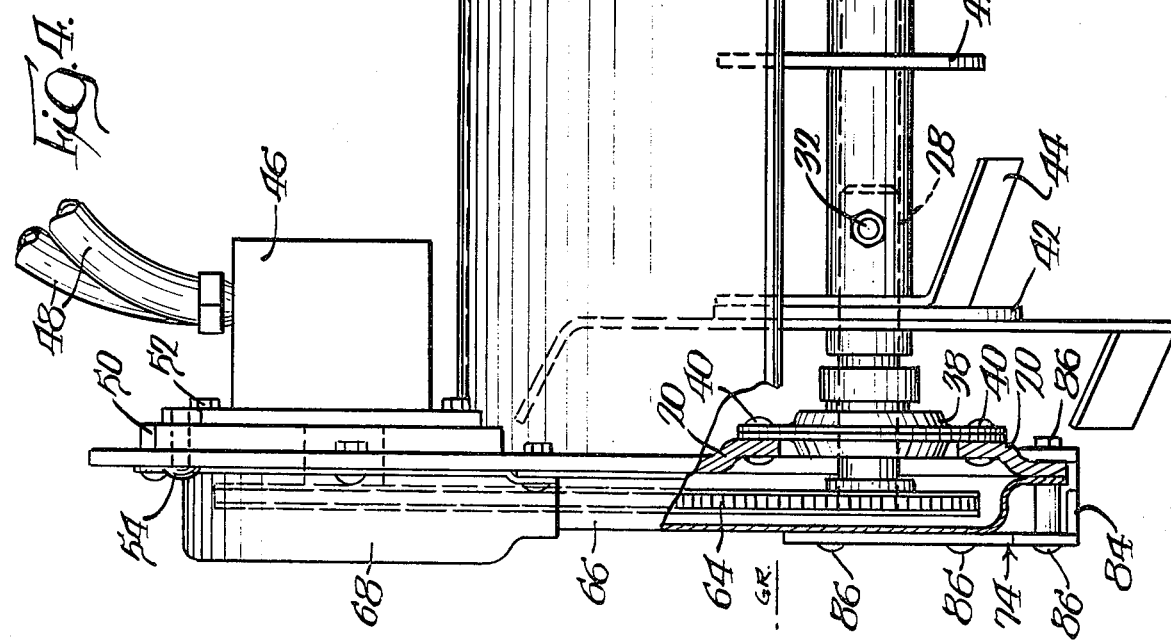

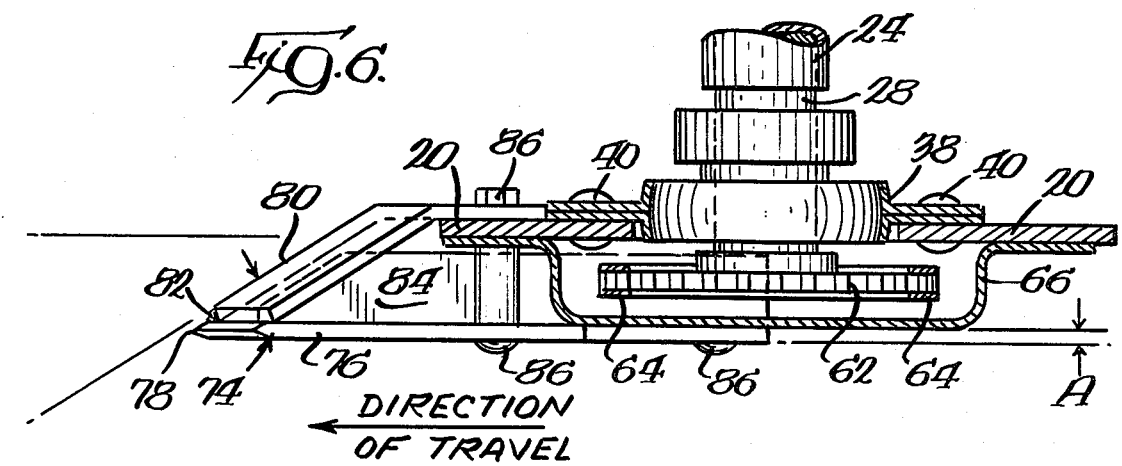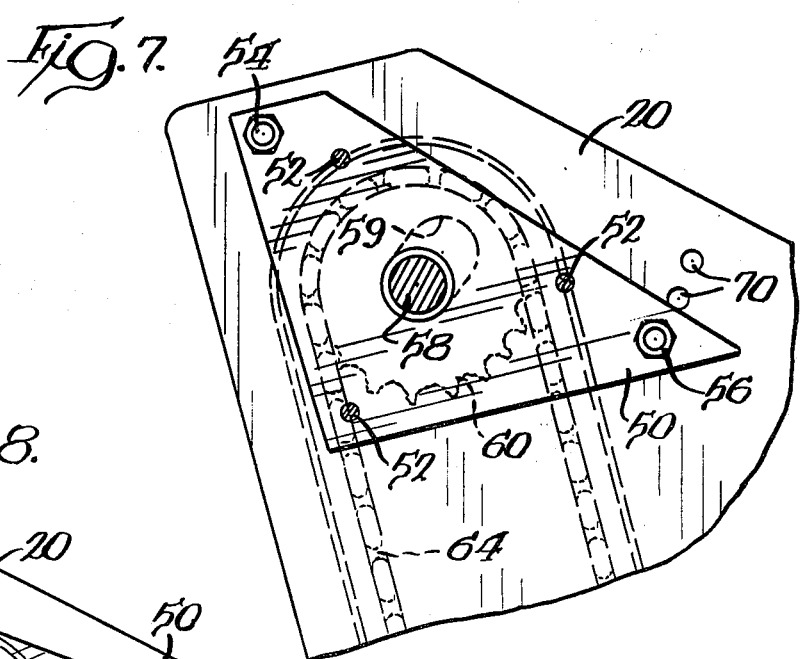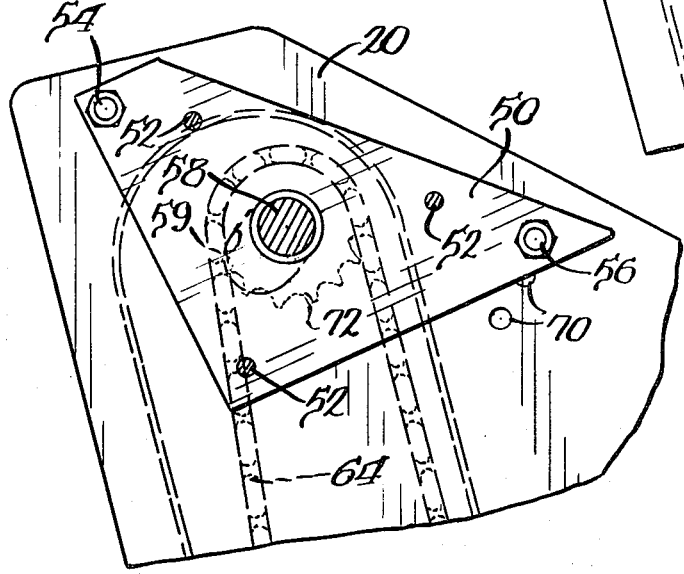

END DRIVE ROTARY CULTIVATOR

TECHNICAL FIELD

The present invention pertains generally to tractor-mounted implements, and more particularly to an end drive rotary cultivator or tiller for soil cultivation.

BACKGROUND OF THE INVENTION

The versatility of tractors and other like equipment is provided by front and rear hitching arrangements for mounting farm implements and other earth-working tools on the tractor. In this fashion, a single tractor unit may be adapted for use to perform a wide variety of soil preparation and cultivation operations. With soil cultivating implements having power-driven mechanisms, the hydraulic system of the tractor may be used for supplying pressurized hydraulic fluid to a hydraulic drive motor on the implement.

One type of soil cultivator which is adapted for mounting at the rear of a tractor is a power driven rotary cultivator or tiller. This type of cultivator typically includes a transversely extending housing adapted for mounting on a tractor hitch, and which rotatably supports a tined cultivator shaft. A drive mechanism operatively connects the cultivator shaft with a suitable power source. While some arrangements include power transmission members mechanically connecting the implement drive mechanism with a drive shaft or the like on the tractor, others include a self-contained source of mechanical power, such as a hydraulic motor, which may be supplied with pressurized hydraulic fluid from the hydraulic system of the tractor for operation of the cultivator. These latter types of arrangements are particularly convenient in that attachment and detachment of the cultivator to and from the tractor is simplified, with the power hook-up for the cultivator being easily accomplished by connection of suitable hydraulic fluid lines.

One drawback to the design of some rotary cultivators is the location of the drive mechanism for rotation of the cultivation shaft near the middle of the shaft. The arrangement of the drive mechanism in this manner prevents the inclusion of tines at the central portion of the shaft. The result of this configuration is usually the existence of a so-called "dead furrow" in the middle of the area tilled by the cultivator. Rotary cultivators which include a shaft drive mechanism disposed at one end of the cultivation shaft obviate this problem and provide a relatively smooth, continuous area of more uniform soil cultivation.

Because rotary cultivators are usually adapted to operate and cultivate soil at certain selected depths, the operation of the cultivator should provide for uniform penetration of the cultivator tines. This is an important consideration for cultivation of seedbeds since the depth of cultivation greatly influences the growing environment of seedlings. During use, some rotary cultivators may tend to "tobaggon" or "ride up" on the soil under certain conditions, thus resulting in undesired lack of uniformity of the depth of cultivation.

Another operational consideration of rotary cultivators relates to the torque input of the tined cultivator shaft. The torque requirements of the shaft differ considerably depending upon soil conditions and the speed of forward movement of the cultivator. In view of this, an arrangement for altering the torque characteristics of the cultivator shaft enhances versatility of the unit.

A further aspect of rotary cultivators design which affects operation is the width of the path of soil which the cultivator tills on a single pass. While a relatively wide path permits the operator of the cultivator to till a given area with fewer number of passes, a relatively wide machine may be unsuited for cultivation where clearance is limited. Thus, a rotary cultivator having an arrangement for selective shortening or lengthening of the rotary cultivation shaft to vary the width of the path of cultivation provides enhanced flexibility and versatility.

In view of these design considerations, a rotary cultivation arrangement which includes features for enhancing proper soil penetration, varying torque characteristics of the cultivation shaft, and altering the width of cultivation would clearly represent a more versatile and flexible unit.

SUMMARY OF THE INVENTION

In accordance with the present invention, an end drive rotary cultivator is disclosed which includes a number of features for increased effectiveness and versatility. The rotary cultivator is adapted to be mounted on a tractor, and comprises a laterally extending housing which rotatably supports a tined cultivation shaft. Drive means disposed at one end of the housing are provided for rotating the cultivation shaft.

In order to provide for effective soil penetration and uniformity of cultivation depth, the present invention includes ground-engaging means mounted on the housing of the cultivator. The ground-engaging means comprises a pointed, plow-like ground-engaging member for urging the cultivator downwardly during forward movement. The ground-engaging member includes a leading edge portion extending angularly rearwardly of the direction of movement of the cultivator. An inwardly extending, angularly disposed surface of the member reactively engages the soil during cultivation for the creation of force components which act upon the cultivator to help keep it transversely aligned during cultivation.

Because a provision for altering the speed ratio of the cultivator drive motor and cultivation shaft is desirable for varying the torque of the shaft, the present invention includes an arrangement for altering this ratio. Specifically, means are provided for altering the distance between the output shaft of the hydraulic drive motor and the cultivation shaft. A movable plate is provided upon which the drive motor is mounted, the plate being selectively positionable on the cultivator housing. A plurality of drive sprockets are provided for mounting on the hydraulic motor drive shaft, with the adjustable nature of the drive motor mounting permitting interchanging of the drive sprockets while enabling a fixed length of roller chain, or other flexible power-transmitting means, to be employed despite changes in drive sprocket size. In this way, changes to the speed ratio of the cultivator may be easily effected with a minimum number of spare parts.

As discussed above, the length of the rotating cultivation shaft determines the width of the path of soil cultivation during operation of the cultivator. While a relatively width path permits cultivation of a wider area on each pass, a more narrow path affords greater maneuverability which may be desirable under conditions where clearance is limited. Thus, the present invention includes an arrangement for removably mounting an extension cultivation shaft to the main cultivation shaft of the tiller. The extension shaft is adapted to be connected to the main shaft at its end opposite its operative connection with the drive motor of the cultivator, and is adapted to be mounted for rotation therewith. The main cultivation includes a removable stub shaft which the cultivation shaft extension is adapted to replace, so that extension of the shaft may easily be accomplished while in the field with a minimum number of replacement parts. A housing cover extension is also provided for use with the cultivation shaft extension. In this way, the path of cultivation of the cultivator may be selectively varied depending upon the operational needs.

Numerous other advantages and features of the present invention will become readily apparent from the following detailed description of the invention and the embodiment thereof, from the claims and from the accompanying drawings in which like numerals are employed to designate like parts throughout the same.

BRIEF DESCRIPTION OF THE DRAWINGS

FIG. 1 is a perspective view illustrating the rotary cultivator of the present invention mounted to the rear of a tractor;

FIG. 2 is a perspective view similar to FIG. 1 illustrating the selective extension of the cultivator assembly;

FIG. 3 is a side elevational view in partial cutaway of the rotary cultivator of FIG. 1;

FIG. 4 is a rear elevational view in partial cutaway of the rotary cultivator of FIG. 1;

FIG. 5 is a view taken along lines 5—5 of FIG. 4;

FIG. 6 is a view taken along lines 6—6 of FIG. 3;

FIGS. 7 and 8 are partial side elevational views illustrating adjustment of the drive mechanism of the rotary cultivator of FIG. 1.

DETAILED DESCRIPTION

While the present invention is susceptible to embodiment in different forms, there is shown in the drawings and will hereinafter be described a presently preferred embodiment with the understanding that the present disclosure is to be considered as an exemplification of the principles of the invention and is not intended to limit the invention to the embodiment illustrated.

With reference now to FIG. 1, therein is illustrated a tractor 10 upon which a rotary cultivator 12 is supported by a rear tractor hitch 14 (shown schematically). While cultivator 12 is illustrated as mounted on a tractor, it could be suitably mounted on another like piece of equipment.

As best shown in FIGS. 3 and 4, cultivator 12 includes a laterally extending, elongated housing including an arcuate, elongated housing cover 16 connected with and extending between a pair of laterally spaced housing plates 18 and 20. A housing channel 19 is coextensive with housing cover 16 and rigidly affixed to the front thereof, with one end portion of channel 19 joined to housing plate 20. A hitch mount 21 is firmly attached to housing channel 19 so that the entire cultivator 12 may be removably mounted on tractor hitch 14.

In order to provide for tilling or cultivation of soil, cultivator 12 includes a transversely extending, rotatably supported tined cultivation shaft 22. Cultivation shaft 22 comprises a tubular outer shaft 24 and a pair of stub shafts 26 and 28 disposed within and detachably connected with outer shaft 24 by suitable mechanical fasteners such as bolt and nut fasteners 30 and 32, respectively. Stub shaft 26 of cultivation shaft 22 is rotatably supported by a bearing assembly 34 mounted on housing plate 18 by mechanical fasteners 36. Similarly, stub shaft 28 is rotatably supported by bearing assembly 38 which is mounted on housing plate 20 by mechanical fasteners 40. It will be appreciated that this configuration of shaft 22 facilitates manufacture of the cultivator since the outer shaft and stub shaft configuration is non-directional.

Cultivation shaft 22 includes a plurality of laterally spaced tine assemblies 42 (all but one being illustrated schematically) each including a plurality of tines 44 which rotate with the shaft assembly for soil cultivation. Notably, the support of each end of cultivation shaft 22 by bearing assemblies respectively mounted on housing plates 18 and 20 provides a unitized cultivator construction with greater integrity, with the independent support of shaft 22 permitting alterations to the cultivator's drive speed ratio and cultivation shaft length, as will be described, without disassembly or resetting of the bearing assemblies.

Power for rotation of cultivation shaft 22 is provided by a housing-mounted hydraulic drive motor 46 which is adapted to drive one end of cultivation shaft 22. Hydraulic motor 46 is typically supplied with pressurized hydraulic fluid through hydraulic lines 48 from the hydraulic system of tractor 10 upon which cultivator 12 is supported. This type of drive system enhances the ease with which cultivator 12 may be mounted on and detached from tractor 10 since no mechanical power transmitting linkages need be provided between the cultivator and the tractor. Rather, cultivator 12 may be easily mounted on tractor hitch 14 by its hitch mount 21, and hydraulic lines 48 connected with the hydraulic system of the tractor. The cultivator is then ready for use. Detachment of the cultivator merely entails disconnecting the hydraulic lines, and removing the cultivator from the tractor hitch.

Because soil conditions may vary greatly between different tilling or cultivation operations, the present invention includes an arrangement for selectively altering the speed ratio of hydraulic drive motor 46 and cultivation shaft 22. Naturally, variation of the speed ratio correspondingly alters the torque characteristics of cultivation shaft 22. To this end, hydraulic motor 46 is mounted upon a movable plate 50 by mechanical fasteners 52, with movable plate 50 in turn being mounted on housing plate 20 by mechanical fasteners 54 and 56.

As shown, hydraulic motor 46 includes a generally horizontally disposed motor output shaft 58 which extends through a slot in housing plate 20. The drive mechanism operatively connecting hydraulic motor 46 with cultivation shaft 22 includes a motor sprocket 60 mounted on motor shaft 58 and keyed thereto or otherwise mounted for rotation therewith. A cultivation shaft sprocket 62 is mounted on one end of cultivation shaft 22 for rotating the shaft. A roller chain 64 extends between and transmits power from the motor shaft and sprocket to the cultivation shaft and sprocket. While it will be appreciated that other drive mechanisms could be provided, or other arrangements including flexible power transmitting means adapted for like service, use of sprockets 60 and 62, and roller chain 64 provides a drive mechanism with a minimal ground-engaging width, yet which is easily capable of transmitting the required power from motor 46 to cultivation shaft 22.

Additionally, a roller chain-type drive provides a durable, relatively low-cost drive mechanism.

In order to protect the drive mechanism, a lower chain guard 66 is removably connected to housing plate 20 by a plurality of mechanical fasteners 67. An upper chain guard 68 is further provided detachably connected to housing plate 20 by mechanical fasteners 69, the upper chain guard 68 being removable without removal of lower chain guard 66. This accommodates selective alteration of the drive speed ratio of the cultivator as follows.

As best shown in FIGS. 7 and 8, selective angular disposition of movable plate 50 upon which hydraulic motor 46 is supported is provided by selective location of mechanical fastener 56 in any one of a plurality of drive adjustment holes 70 defined by housing plate 20. When motor sprocket 60, having a relatively large number of teeth, is mounted on motor shaft 58 as shown in FIG. 7, movable plate 50 would be disposed generally as shown. When it is desired to alter the speed ratio of hydraulic motor 46 and cultivation shaft 22, and thus the torque characteristics of shaft 22, upper chain guard 68 may be removed and motor sprocket 60 replaced with a motor sprocket 72 having a relatively fewer number of teeth. Naturally, employing a drive sprocket having relatively fewer teeth on motor shaft 58, while cultivation shaft sprocket 62 remains in place, lowers the speed and increases the torque of cultivation shaft 22 given a fixed speed and torque output of hydraulic motor 46.

With motor sprocket 76 in place on motor shaft 58, it is necessary that the additional slack created in roller chain 64 be eliminated so that the chain operates at its proper tension. While shortening of the chain could accomplish this end, this would necessitate inclusion of at least one additional master link in the chain as well as one of more removable chain sections so that the length of the chain could be altered. Alteration of the chain's length in this fashion would be time-consuming, with the additional specialized chain links decreasing the durability of the chain drive.

The present invention includes a roller chain of a fixed length, with proper tensioning of the chain after changing of drive sprockets mounted on motor shaft 58 provided by the movable mounting of hydraulic motor 46. Specifically, movable plate 50 which supports motor 46 may be selectively pivoted about fastener 54 by relocation of mechanical fastener 56 within adjustment holes 70 so that roller chain 64 may be provided with proper tension without altering its length. By thus providing selective alteration of the distance between motor shaft 58 and cultivation shaft 22, changes to the speed ratio of cultivator 12 may be readily effected with a minimal number of replacement components in an efficient and straightforward fashion. Because plate 50 may be moved, a selective change in the effective size of the sprocket on motor shaft 58 merely requires movement of the plate to properly tension roller chain 64. After this adjustment is made, upper chain guard 68 may be replaced and cultivation operations continued.

Of critical importance during cultivation or tilling operations is the maintenance of relatively uniform soil penetration by tines 44 of cultivation shaft 22. The exact characteristics of the area of cultivation greatly influences the growth of seedlings in the cultivated seedbed, affecting water retention and run-off of the soil. To this end, cultivator 12 includes a ground-engaging arrangement for urging the cultivator downwardly into the soil so that proper soil penetration is assured.

The ground-engaging arrangement of the cultivator includes a pointed, plow-like ground-engaging member 74 including an assembly of plates suitably welded or otherwise assembled. Ground-engaging member 74 includes an outer plate 76, the surface of which is preferably disposed generally parallel to the direction of forward movement of the cultivator, or which may be slightly angled inwardly toward the tines of cultivation shaft 22. Outer plate 76 protects lower chain guard 66 and the drive mechanism of the cultivator from impacting unfractured soil. Significantly, the outer surface of outer plate 76 is spaced from the surface of lower chain drive 66 a distance "A" (see FIG. 6) to minimize the drag caused by unfractured soil rubbing against this end of the cultivator assembly.

As shown, the leading edge portion 78 of outer plate 76 is suitably beveled in order to enhance its soil cutting action, and as shown in FIG. 3 extends angularly rearwardly of the cultivator to provide a first, negatively angled entry surface.

Ground-engaging member 74 further includes an inner plate 80 welded to outer plate 76 at 82. The leading edge of inner plate 80 is generally coextensive with the leading edge portion 78 of outer plate 76, with plate 80 extending angularly inwardly and rearwardly of the cultivator from the leading edge portion. Member 74 also includes a lower plate 84 connected with outer plate 76 and extending between outer plate 76 and inner plate 80. Lower plate 84 provides ground-engaging member 74 with a generally closed, lower surface. This acts to minimize the possibility of increased drag caused by a build-up of compacted soil at the bottom of ground-engaging member 74. Although lower plate 84 is illustrated as only partially closing the bottom of member 74, this configuration represents a balancing of fabrication limitations and the benefits of a completely closed bottom for member 74. As shown in FIG. 3, a plurality of mechanical fasteners 86 detachably connect ground-engaging member 74 to housing plate 20, thus affording ready removal of the member for service or replacement.

During forward movement of cultivator 12 by tractor 10, soil impacting upon the first, second, and third ground-engaging surfaces of plates 80, 76, and 84, respectively, induces the creation of force components on the cultivator. Specifically, the rearward angular disposition of leading edge portion 78 of outer plate 76 and inner plate 80 results in the creation of a downward force component on member 74 which acts to urge the entire cultivator 12 downwardly during soil cultivation. This effect is desirable in that rotary cultivators sometimes tend to ride up or "toboggan" on the soil surface, and therefore fail to provide the desired uniform depth of soil cultivation.

During forward movement of the cultivator, the impacting of soil upon ground-engaging member 74 further provides the creation of horizontal force components on the cultivator. These horizontal force components extend perpendicularly to each other, one opposite the direction of forward movement, and the other outwardly perpendicular to the movement. These force components counteract each other and act to maintain the tiller perpendicular to the direction of forward travel as desired. Additionally, the plow-like configuration of member 74 acts to "plow" the soil at this portion of the cultivator and direct it toward the rotating cultivation shaft 22 for a more uniform cultivation. Grasses, wood fibers and similar materials tend to be cut and directed sideways without significantly inhibiting penetration of the cultivator housing and the rotating lines.

In order to further enhance the soil engaging nature of the present cultivator, its ground-engaging arrangement further includes a second negatively angled entry surface. This surface comprises the leading edge portion 87 of housing plate 18 disposed at the other end of the housing from housing plate 20 upon which member 74 is mounted. Edge portion 87 extends angularly rearwardly similar to edge portion 78 of member 74. The disposition of this leading edge portion 87 further acts to urge cultivator 12 downwardly during forward movement through the soil to be cultivated, and creates force components which act together with the horizontal force components on ground-engaging member 74 to maintain the cultivator in a perpendicular disposition with respect to the direction of its forward movement. Housing plate 18 which includes edge portion 87 is dimensioned as narrow as possible so that drag on the cultivator and areas of non-cultivation are minimized. Thus, the spaced, negative angles of entry surfaces of cultivator 12 act to minimize tobagonning that commonly occurs with rotary cultivators heretofore known, particularly those having gear cases or drive mechanisms that extend and angle down and rearwardly to drive the rotating cultivation shaft.

So that the versatility of cultivator 12 may be increased, the cultivator is provided with an arrangement for altering the effective width of its path of cultivation. Specifically, a tined extension cultivation shaft 88 is provided, and is adapted to be mounted to one end of cultivation shaft 22 for rotation therewith. As best shown in FIG. 4, extension shaft 88 includes a shaft portion 90 and a plurality of spaced tine assemblies 92 (shown schematically) mounted on shaft portion 90.

Attachment of the extension shaft to the main cultivation shaft 22 is provided by the detachable nature of stub shaft 26 of cultivation shaft 22. As shown, stub shaft 26 may be removed from tubular outer shaft 24 of shaft 22 by removal of fastener 30. When this is done, stub shaft 26 may be withdrawn through bearing assembly 34 from tubular outer shaft 24. Extension shaft 88 may then be inserted through bearing assembly 34 and into outer tubular shaft 24 in place of stub shaft 26. Fastener 30 is then again attached so that outer shaft 24 of shaft 22 and shaft 88 are connected for rotation together. In this way, the width of the path of soil cultivated by cultivator 12 may be selectively increased or decreased depending upon the needs for soil cultivation in a specific area. Extension of the cultivator assembly is completed by an extension cover 94 which is adapted for detachable connection with housing cover 16 by mechanical fasteners 96.

Thus, a rotary cultivator of enhanced versatility is disclosed which includes arrangements for varying the torque output of the rotating cultivation shaft, as well as for selectively altering the length of the cultivation shaft depending upon the requirements of the job to be performed. Additionally, the cultivator includes a ground-engaging arrangement which acts to urge the cultivator downwardly into the soil during forward movement for improving the uniformity of the depth of cultivation.

Among the advantages of use of this design are a smoother tilled seedbed with more uniform bottom surface (the separation between the tilled soil and the untilled soil at the depth of penetration). This enhances even distribution of moisture as it enters from the surface. A more even top surface, free from uncultivated portions in the area of the cultivator drive mechanism and "dead furrows", is also provided, reducing the required raking and leveling prior to seeding.

Further advantages of the present design include elimination of skid-shoe leveling controls that are typically required or previously known cultivator arrangements to control their depth of penetration. Additionally, there is no need for a spike or retard device commonly mounted on prior arrangements for control of the forward motion of the cultivator or for fracturing soil behind or below the drive of the cultivator.

From the foregoing, it will be appreciated that numerous variations and modifications may be effected without departing from the true spirit and scope of the novel concept of the present invention. It will be understood that no limitations with respect to the specific embodiment illustrated herein is intended or should be inferred. If is, of course, intended to cover by the appended claims all such modifications as fall within the scope of the claims.

What is claimed is:

1. A rotary cultivator adapted to be mounted on a tractor for soil cultivation, comprising:
   a laterally extending housing,
   a tine cultivation shaft rotatably supported by said housing,
   drive means disposed at one end of said housing for rotating said cultivator shaft, and
   ground-engaging means on said housing for urging the cultivator downwardly during forward movement thereof for enhancing soil cultivation by said cultivation shaft, comprising
   a ground-engaging member mounted on said housing having a first leading edge portion extending angularly rearwardly of the direction of forward movement of the cultivator and including
   a first ground engaging surface extending angularly inwardly and rearwardly of said leading edge portion and
   a second ground-engaging surface extending rearwardly of said leading edge generally parallel to the direction of forward movement of said cultivator.

2. A rotary cultivator in accordance with claim 1, wherein
   said ground-engaging member further includes a third ground-engaging surface disposed beneath and extending between said first and second ground-engaging surfaces.

3. A rotary cultivator adapted to be mounted on a tractor for said cultivator, comprising:
   a laterally extending cultivator housing,
   a tined cultivation shaft rotatably supported by said housing,
   drive means operatively connected with one end of said cultivation shaft for rotation thereof, and
   a cultivation shaft extension adapted to be selectively connected to a portion of said cultivator shaft for rotation therewith for selectively extending the area of soil cultivation of said cultivator,
   said cultivation shaft includes a stub shaft disposed in an outer shaft, said stub shaft being removable from said outer shaft and said shaft extension being insertable in said outer shaft in place of said stub shaft.

4. A rotary cultivator in accordance with claim 3 and ground-engaging means mounted on said housing for urging the cultivator downwardly during foward movement thereof for enhancing soil cultivation by said cultivation shaft including a leading edge portion extending angularly rearwardly of the direction of forward movement of the cultivator.

* * * * *